UNITED STATES PATENT OFFICE.

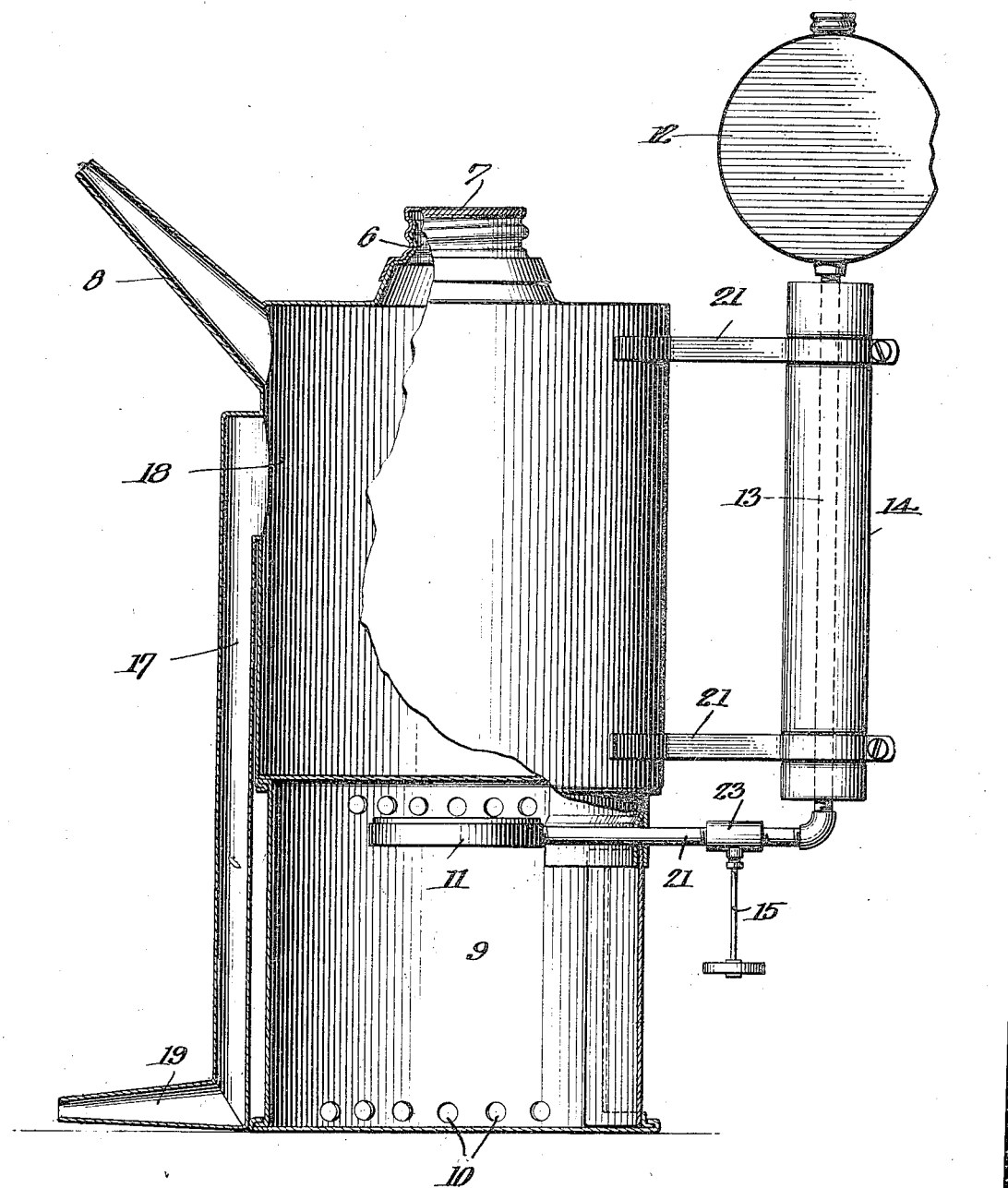

PAUL GREGOR HANZADIAN, OF NASHUA, NEW HAMPSHIRE.

INSECT-EXTERMINATOR.

1,259,230.  Specification of Letters Patent.  Patented Mar. 12, 1918.

Application filed August 21, 1915. Serial No. 46,761.

*To all whom it may concern:*

Be it known that I, PAUL GREGOR HANZADIAN, an Armenian, subject of the Sultan of Turkey, and resident of Nashua, in the county of Hillsborough and State of New Hampshire, have invented certain new and useful Improvements in Insect-Exterminators, of which the following is a specification.

My invention relates to improvements in insect exterminators, and more particularly to a device which gives the desired result without the use of poisonous compositions or with compositions having objectionable odors.

One of the objects of my invention is to provide a device of this kind which will exterminate insects by the use of steam, which when brought into contact with the insects kills the same and at the same time destroys any eggs which might be present.

Referring to the drawings, the figure illustrates a steam generator partly broken away and constructed according to my invention.

In the drawing the numeral 5 illustrates a water receptacle forming the upper part of the device, the top or upper portion of the water receptacle being provided with an upwardly extending threaded flange 6 adapted to receive the threaded cap 7 and it will be seen that when the cap 7 is removed, the opening formed by the flange 6 provides efficient means for filling the water receptacle. Adjacent the upper end of the water receptacle 5 is a spout 8 which has communication with the water receptacle 5 and forms the outlet for the steam which is generated in said water receptacle.

Forming the lower part of the device is a casing 9 having suitable openings 10 adjacent the upper and lower edges thereof, and this member 9 forms the burner chamber for the burner 11 which has communication with a suitable supply tank 12 through pipe 13 extending through the handle 14, the flow of fuel through said pipe 13 being controlled by a suitable valve mechanism 15. A suitable overflow pipe 17 is in communication with the water receptacle 5 through the opening 18, which is disposed directly under the spout 8, the overflow pipe extending longitudinally of the device and terminating adjacent the bottom thereof in a right angled portion 19.

The handle member 14 is connected to the water receptacle 5 by means of brackets 21, a portion of said brackets being clamped around the handle, whereby the handle and water supply tank are held securely thereto.

It may be further stated that the coupling 23 is threaded to the pipe 13 to provide means for unscrewing the burner 11 in the event that it should become desirable to remove the same.

I claim

In a steam generating device, an upper water receptacle, and a lower burner chamber, said burner chamber having openings for admitting air to the burner chamber, an overflow pipe having its upper end in communication with the water chamber, said pipe extending downwardly and terminating in a right angled end, a handle on the water chamber, a burner in the burner chamber, and means extending through the handle for supplying fuel to the burner.

PAUL HANZADIAN.

Copies of this patent may be obtained for five cents each, by addressing the "Commissioner of Patents, Washington, D. C."